July 4, 1950 — I. NESSON — 2,513,510
CONNECTOR FOR WIPER BLADES
Filed Jan. 7, 1947 — 2 Sheets-Sheet 1
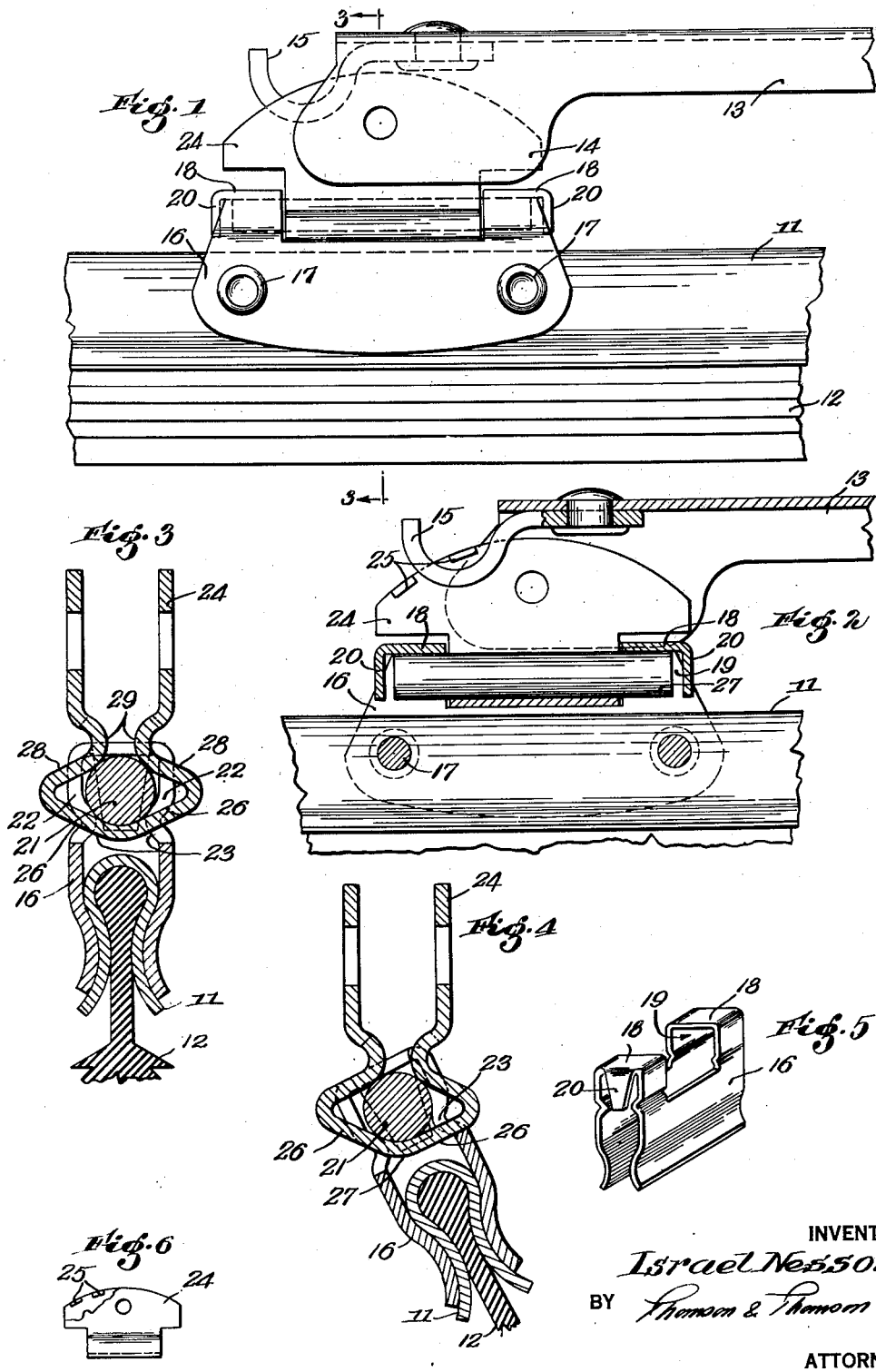
INVENTOR
Israel Nesson,
BY Thomson & Thomson
ATTORNEYS

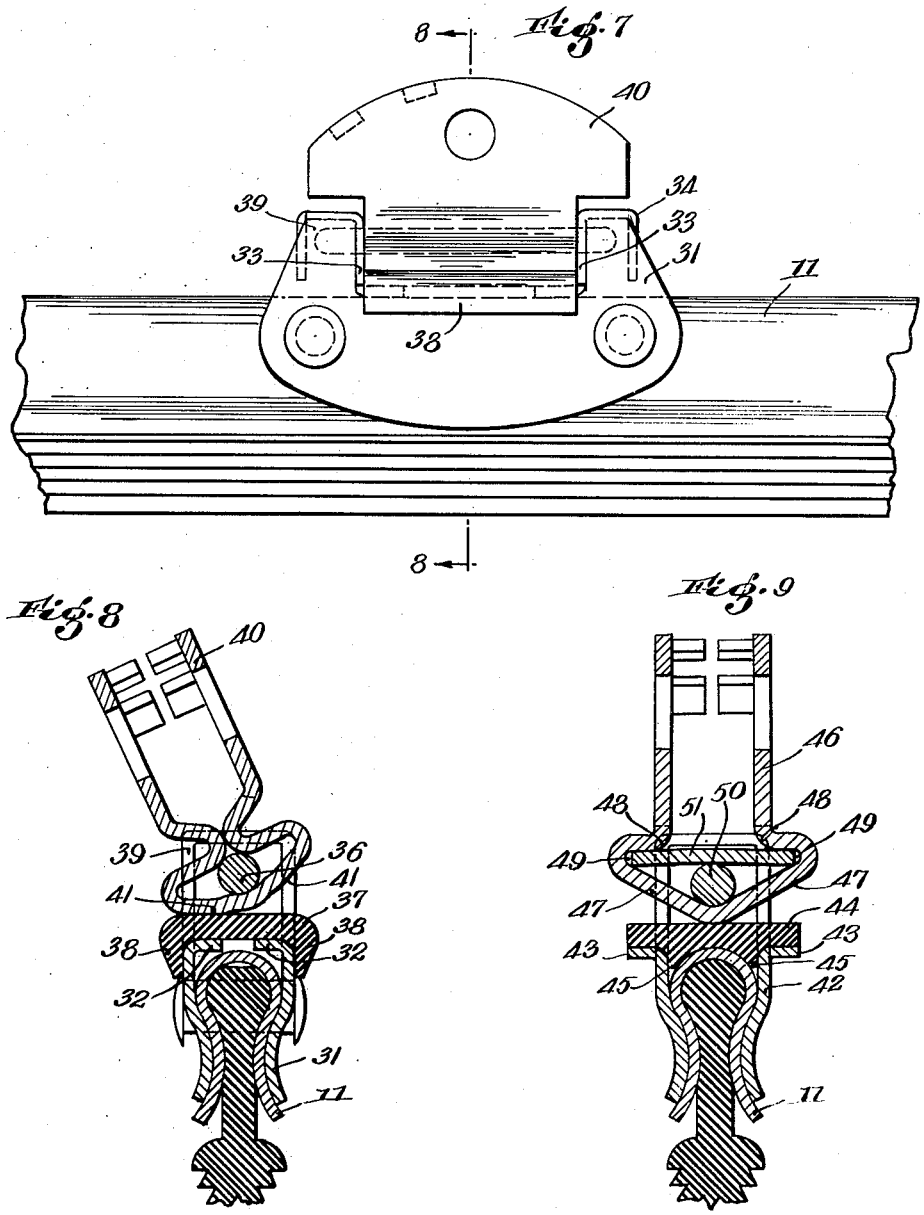

Patented July 4, 1950

2,513,510

UNITED STATES PATENT OFFICE 2,513,510

CONNECTOR FOR WIPER BLADES

Israel Nesson, Lynn, Mass., assignor to
Max Zaiger, Swampscott, Mass.

Application January 7, 1947, Serial No. 720,646

9 Claims. (Cl. 15—250)

1

This invention relates to connectors for wiper blades, and pertains more particularly to improvements in a rocking connector for separably attaching a windshield wiper arm to a wiper blade, the connector being of the general type disclosed in Zaiger Patents Nos. 2,234,791, dated March 11, 1941, and 2,280,566, dated April 21, 1942.

The said patents describe a rocking connector comprising a sub-clip fixedly secured to the conventional wiper blade, and a clip member hinged to the sub-clip and adapted to be removably engaged by the end of the wiper arm. The patented connectors are generally satisfactory and efficient in use, but they do not afford a true pivot between the movable elements thereof, and they are sometimes noisy in use due to chattering between the connected parts.

It is accordingly the principal purpose of the present invention to provide a rocking connector which affords a true pivot, ensures accurate control of the pivotal bearing, eliminates side or end play between the parts and limits the lateral swinging motion of the clip.

A further object of the invention is to provide a resiliently cushioned bearing between the relatively movable parts of the connector, so that there will be no clicking contact of the parts and the operation of the connector will be completely silent.

Recommended embodiments of the invention are illustrated in the accompanying drawings, in which:

Fig. 1 is a fragmentary side elevation of a wiper blade, and wiper arm, separably coupled by one form of the improved, pivoted connector;

Fig. 2 is a central longitudinal section of the connector shown in Fig. 1, with the wiper blade, arm hook and pivot pin in elevation;

Fig. 3 is an enlarged transverse section on line 3—3 of Fig. 1, with the wiper arm omitted;

Fig. 4 is a sectional view similar to Fig. 3, but showing the blade disposed at an angle with respect to the clip;

Fig. 5 is a perspective view of the sub-clip;

Fig. 6 is a reduced side view, partly broken away, of the clip member;

Fig. 7 is a view similar to Fig. 1 (with the wiper arm omitted) illustrating a modified form of connector comprising a cushioning saddle engaged by the clip;

Fig. 8 is an enlarged section on line 8—8 of Fig. 7;

Fig. 9 is a view similar to Fig. 8 showing a further modification; and

Fig. 10 is a reduced plan view of a blank used in forming the sub-clip of Figs. 7 to 9.

The improved connector may be applied to any conventional wiper blade and may be used with wiper arms having hooked ends, U-shaped attaching portions, or both, as explained in the aforesaid patents. As here shown, the wiper blade comprises a shell 11 of sheet metal, crimped over the upper portion of the rubber wiper strip 12; and the wiper arm 13 is provided with a U-shaped end 14 and a hook piece 15, to which the connector clip is attached as set forth in said Zaiger patents.

In accordance with this invention and in the form illustrated in Figs. 1 to 6, the connector comprises a sub-clip 16 of generally U-shaped configuration, having its sides embracing the blade shell 11 and secured thereto by rivets 17 passing through the shell and the rubber strip. The top of the sub-clip is cut away at its central region to provide spaced bridge members 18 disposed at its respective ends and defining underlying pockets 19 which are partially closed by end tabs 20 bent downwardly after the insertion of a cylindrical pivot pin 21. The sides 22 of the bridge members are shaped to provide shoulders 23 which retain the pin 21 in the upper portion of the sub-clip and against its top; but these sides need not be accurately conformed to the contours of the pin, so long as transverse movement of the pin in the sub-clip is avoided.

The clip 24 is of generally inverted U-shape, having its sides fitting between the sides of the arm end 14 and formed with inwardly directed lugs 25 (Fig. 6) between which the hook 15 is received in the conventional manner. The closed bottom portion of the clip fits within the space between the bridge members 18 of the sub-clip, and is shaped to afford true and smooth pivotal action on the pin 21, and to provide a stop limiting the rocking movement of the clip.

As best shown in Figs. 3 and 4, the clip has a base defined by relatively inclined walls 26 meeting at an obtuse interior angle 27, and a pair of inwardly directed, oblique walls 28 terminating at interior shoulders 29. These walls form relatively narrow bearing zones for the pin 21.

After the bottom portion of the clip is placed in the opening between the bridge members 18, the cylindrical pivot pin 21 is slid endwise beneath one of the bridges and through the wall-bearings of the clip, pivotally to connect the clip to the sub-clip. The ends of the pin are disposed in the pockets 19, and the tabs 20 are bent downwardly to prevent endwise displacement of the pin.

A rocking connector constructed as above described is simple and economical to manufacture and assemble, for the precise size and shape of the pivot bearings and other parts are not critical, and no springs are required to prevent looseness or chattering of its pivotally connected parts. The clip 24 swings with a true pivotal bearing on the pin 21, and the extent of swinging movement is limited by the engagement of one of the base walls 26 with the upper edge of one of the clip sides, as shown in Fig. 4.

In the modified form shown in Figs. 7 and 8, the sub-clip 31 is attached to the blade shell 11 in the same manner as the sub-clip 16 of the previous views, but its upper portion is shaped to provide inwardly directed side tongues 32 and downwardly directed journal tabs 33, in addition to the end tabs 34. The sub-clip is preferably formed from a cut-out metal blank, as shown in Fig. 10, by bending down its opposed sides and the journal tabs 33 which are apertured at 35 to provide bearing for the pivot pin or rod 36.

The tongues or flanges 32 provide a smooth and relatively broad top surface in the central portion of the cut-away sub-clip 31, and a saddle member 37 of rubber or other resilient material, having depending sides 38 rests on said flanges and embraces and grips the sides of the sub-clip. The bridge members 39 at the ends of the sub-clip have substantially straight sides, as shown in the aforesaid Zaiger patents, for the provision of the shoulders 23 of Figs. 3 and 4 is not necessary in the modified construction.

The clip 40 is generally similar in construction and operation to the clip 24 of Figs. 1 to 4, its base being shaped to grip the pivot pin 36 and to provide inclined bottom walls 41 which engage the broad upper surface of the cushioning saddle 37 and thus limit the rocking movement of the clip, as shown in Fig. 8. It will be understood, as aforesaid, that the pin or rod 36 rotates in the bearing openings 35 of the journal tabs 33, so that a pivotal bearing between the rod and the clip base is not required, and the shape of the clip base is not critical so long as it closely fits the rod to avoid looseness which would cause chattering.

The cushion 37 provides a silent bearing and stop for the clip base and resiliently holds the connected parts in proper position so that there is no play or looseness at the true pivotal bearings in the tabs 33. The parts are assembled by fitting the clip in the central recess or socket of the sub-clip, sliding in the pivot rod and then folding down the end tabs 34 to retain the rod in place.

In the further and preferred modification of Fig. 9, the sub-clip 42 is also made from a blank such as that of Fig. 10, but the tongues 32 of Fig. 10 are bent outwardly to provide the flanges 43 of Fig. 9.

The resilient, cushioning saddle 44 is shaped with bottom projections 45 fitting over the curved top of the blade shell 11 and with margins resting on the flanges 43. The saddle is held in place by the projections 45 and by the engagement of the base of the clip 46 thereon.

The clip base has inclined bottom walls 47, as in Fig. 8, and the clip sides are formed with shoulders 48 defining opposed interior grooves 49.

The pivot rod 50 rotates in the journal tabs of the sub-clip and passes through the base of the clip, as in the previous construction (Figs. 7 and 8), and a flat bar or plate 51 is slidably received in the grooves 49 and bears in the pivot rod 50, to hold the rod in fixed position against the clip base. The ends of the bar are received in the pockets underlying the bridge portions 39 (Fig. 7) of the sub-clip and are retained against displacement, together with the pivot rod, by the end tabs of the sub-clip. It is preferred, however, to provide a tight, frictional engagement between the rod 50 and the plate 51, so that the rod and plate are firmly held in place, irrespective of the end closures afforded by the tabs 34 of Fig. 7. For this purpose, the plate 51 is made of relatively thin, flexible material, and is flexed transversely as it is pushed inwardly between the shoulders 48 and the rod 50 under flexed tension. The frictional resistance of the deflected plate on the rod serves to clamp the rod and plate against longitudinal displacement and also prevents transverse displacement or play between the rod 50 and the base of the clip 46.

I claim:

1. A connector for attaching a wiper arm to a wiper blade, comprising a sub-clip connectable to the blade and having spaced sides and longitudinally spaced bridge members integral with the sides adjacent the ends thereof and defining underlying pockets, a rocking clip connectable to the wiper arm and having spaced sides and an integral base received in the space between the bridge members of the sub-clip, and a pivot pin disposed between the sides of the clip at the bottom thereof and having ends extending into the pockets beneath said bridge members for pivotally connecting the connector elements so that the clip may rock transversely relative to the sub-clip, the clip and sub-clip each having means engaging the pivot pin and restraining transverse movement of the pin relative thereto, said clip consisting of a strip of sheet metal having a base portion shaped in angular form, the base of the clip having relatively inclined walls respectively engageable with a portion of the sub-clip to limit rocking movement of the clip in both directions, the inner surfaces of said inclined walls providing a relatively narrow, longitudinal zone of bearing contact with said pivot pin, and portions of the respective clip sides being spaced from said pin.

2. A connector for attaching a wiper arm to a wiper blade, comprising a sub-clip connectable to the blade and having spaced sides and longitudinally spaced bridge members integral with the sides adjacent the ends thereof and defining underlying pockets, a rocking clip connectable to the wiper arm and having spaced sides and an integral base received in the space between the bridge members of the sub-clip, and a pivot pin disposed between the sides of the clip at the bottom thereof and having ends extending into the pockets beneath said bridge members for pivotally connecting the connector elements so that the clip may rock transversely relative to the sub-clip, the clip and sub-clip each having means engaging the pivot pin and restraining transverse movement of the pin relative thereto, the sides of the sub-clip having transverse flanges disposed below the clip base and substantially at right angles to said sides, and a relatively wide, resilient cushioning saddle applied to said flanges and engaged by said clip base.

3. A connector for attaching a wiper arm to a wiper blade, comprising a sub-clip connectable to the blade and having spaced sides and longitudinally spaced bridge members integral with the sides adjacent the ends thereof and defining underlying pockets, a rocking clip connectable to the wiper arm and having spaced sides and an integral base received in the space between the bridge members of the sub-clip, and a pivot pin disposed between the sides of the clip at the bottom thereof and having ends extending into the pockets beneath said bridge members for pivotally connecting the connector elements so that the clip may rock transversely relative to the sub-clip, the clip and sub-clip each having means engaging the pivot pin and restraining transverse movement of the pin relative thereto, the sides of the sub-clip having transverse flanges disposed below the clip base and substantially at right angles to said sides, and a relatively wide, resilient cushioning saddle applied to said flanges and engaged by said clip base, said clip base having relatively inclined walls respectively engageable with said saddle to limit rocking movement of the clip in both directions.

4. A connector for attaching a wiper arm to a wiper blade, comprising a sub-clip connectable to the blade and having transversely spaced sides and longitudinally spaced bridge members integral with the sides adjacent the ends thereof and defining underlying pockets, a rocking clip connectable to the wiper arm and having spaced sides and an integral base received between said bridge members, a pivot pin disposed between the sides of the clip at the bottom thereof and having ends projecting into the pockets beneath the bridge members for pivotally connecting the connector elements so that the clip may rock relative to the sub-clip, the sides of the sub-clip having indented shoulders holding the ends of the pin against the bridge members, and the sides and bottom portion of the clip engaging said pin along relatively narrow longitudinal zones constituting bearing surfaces on said pivot.

5. A connector for attaching a wiper arm to a wiper blade comprising a sub-clip connectable to the blade and having transversely spaced sides and longitudinally spaced bridge members integral with the sides adjacent the ends thereof, and defining underlying pockets, a rocking clip connectable to the wiper arm and having spaced sides and an integral base received between said bridge members, a pivot pin disposed between the sides of the clip at the bottom thereof and having ends projecting into the pockets beneath the bridge members for pivotally connecting the connector elements so that the clip may rock relative to the sub-clip, the sides of the sub-clip having indented shoulders holding the ends of the pin against the bridge members, the sides and bottom portion of the clip engaging said pin along relatively narrow longitudinal zones constituting bearing surfaces on said pivot, and the base of the clip having relatively inclined surfaces engageable with an edge of each side of the sub-clip, to limit the rocking motion of the clip in both directions.

6. A connector for attaching a wiper arm to a wiper blade, comprising a sub-clip connectable to the blade and having transversely spaced sides and longitudinally spaced bridge members integral with the sides adjacent the ends thereof, and defining underlying pockets, a rocking clip connectable to the wiper arm and having spaced sides and an integral base received between said bridge members, a pivot pin disposed between the sides of the clip at the bottom thereof and having ends projecting into the pockets beneath the bridge members for pivotally connecting the connector elements so that the clip may rock relative to the sub-clip, the sides of the sub-clip having indented shoulders holding the ends of the pin against the bridge members, the sides of the clip having interior longitudinal shoulders respectively engaging the pin along relatively narrow bearing zones at the top thereof, and the base of the clip having interior walls inclined relative to each other at an obtuse angle and engaging the bottom of the pin at the juncture of said walls along a relatively narrow bearing zone.

7. A connector for attaching a wiper arm to a wiper blade, comprising a sub-clip connectable to the blade and having transversely spaced sides and longitudinally spaced bridge members integral with the sides adjacent the ends thereof, and defining underlying pockets, a rocking clip connectable to the wiper arm and having spaced sides and an integral base received between said bridge members, a pivot pin disposed between the sides of the clip at the bottom thereof and having ends projecting into the pockets beneath the bridge members for pivotally connecting the connector elements so that the clip may tilt relative to the sub-clip, the sides of the sub-clip having indented shoulders holding the ends of the pin against the bridge members, the sides of the clip having interior longitudinal shoulders respectively engaging the pin along relatively narrow bearing zones at the top thereof, and the base of the clip having interior walls inclined relative to each other at an obtuse angle and engaging the bottom of the pin at the juncture of said walls along a relatively narrow bearing zone, said walls having outer surfaces engageable with an edge of each side of the sub-clip, to limit the tilting motion of the clip in both directions.

8. A connector for attaching a wiper arm to a wiper blade, comprising a sub-clip connectable to the blade and having transversely spaced sides and longitudinally spaced bridge members integral with the sides adjacent the ends thereof, and defining underlying pockets, a rocking clip connectable to the wiper arm and having spaced sides and an integral base received between said bridge members, a pivot rod disposed between the sides of the clip at the bottom thereof and having ends projecting into the pockets beneath the bridge members for pivotally connecting the connector elements so that the clip may rock relative to the sub-clip, said bridge members having journal tabs receiving the end portions of the pivot rods, the clip sides having opposed interior grooves, and a plate received between said grooves and bearing on the rod, thereby holding the rod against the clip base.

9. A connector for attaching a wiper arm to a wiper blade, comprising a sub-clip connectable to the blade and having transversely spaced sides and longitudinally spaced bridge members integral with the sides adjacent the ends thereof, and defining underlying pockets, a rocking clip connectable to the wiper arm and having spaced sides and an integral base received between said bridge members, a pivot rod disposed between the sides of the clip at the bottom thereof and having ends projecting into the pockets beneath the bridge members for pivotally connecting the connector elements so that the clip may rock relative to the sub-clip, said bridge members having journal elements receiving the end portions of the pivot rod, the clip sides having interior shoulders, and a flexible plate disposed between said shoulders and said rod under flexed tension, whereby the rod is pressed against the clip base.

ISRAEL NESSON.

REFERENCES CITED

The following references are of record in the file of this patent:

UNITED STATES PATENTS

| Number | Name | Date |
|---|---|---|
| 1,703,181 | Tarver | Feb. 26, 1929 |
| 2,270,589 | Hansen | Jan. 20, 1942 |